United States Patent
Beers et al.

(10) Patent No.: US 9,651,091 B2
(45) Date of Patent: May 16, 2017

(54) THRUST PLATE ASSEMBLY

(71) Applicant: Hamilton Sundstrand Corporation, Windsor Locks, CT (US)

(72) Inventors: Craig M. Beers, Wethersfield, CT (US); Seth E. Rosen, Middletown, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 509 days.

(21) Appl. No.: 14/231,868

(22) Filed: Apr. 1, 2014

(65) Prior Publication Data
US 2015/0275910 A1 Oct. 1, 2015

(51) Int. Cl.
*F16C 33/74* (2006.01)
*F01D 25/16* (2006.01)
*F02C 1/04* (2006.01)
*F02C 7/06* (2006.01)
*F02C 7/32* (2006.01)
*F04D 29/051* (2006.01)

(52) U.S. Cl.
CPC ............ *F16C 33/74* (2013.01); *F01D 25/168* (2013.01); *F02C 1/04* (2013.01); *F02C 7/06* (2013.01); *F02C 7/32* (2013.01); *F04D 29/0513* (2013.01); *Y10T 29/49236* (2015.01)

(58) Field of Classification Search
CPC .... F16C 33/74; F02C 1/04; F02C 7/06; F02C 7/32; F04D 29/0513; F01D 25/168; Y10T 29/49236
See application file for complete search history.

(56) References Cited

U.S. PATENT DOCUMENTS

| 8,974,121 | B1 * | 3/2015 | Rudolph | ................. F16C 33/08 384/420 |
|---|---|---|---|---|
| 2007/0110349 | A1 * | 5/2007 | Groves | .................... F01D 25/18 384/368 |
| 2009/0274548 | A1 * | 11/2009 | Joco | ........................ F01D 11/02 415/112 |
| 2014/0154058 | A1 * | 6/2014 | Meacham | ............. F01D 25/166 415/170.1 |

FOREIGN PATENT DOCUMENTS

WO WO 2014014791 A1 * 1/2014 .......... F16C 33/1045

* cited by examiner

*Primary Examiner* — Audrey K Bradley
(74) *Attorney, Agent, or Firm* — Cantor Colburn LLP

(57) ABSTRACT

An aspect is a thrust plate assembly for an air cycle machine. The thrust plate assembly includes an annular body defined by an outer rim and a main bore. The annular body includes a nozzle side and a thrust bearing side. The nozzle side includes a nozzle region proximate the outer rim and a turbine rotor region proximate the main bore, where the outer rim has an outer diameter. The thrust plate assembly also includes a main bore seal installed in the main bore. The main bore seal has an inner diameter, where a ratio of the outer diameter of the outer rim to the inner diameter of the main bore seal is between 3.94 and 3.96.

14 Claims, 3 Drawing Sheets

THRUST PLATE ASSEMBLY

BACKGROUND OF THE INVENTION

Exemplary embodiments of the present invention relate to air cycle machines and, more particularly, to a thrust plate assembly for an air cycle machine utilized as part of an aircraft environmental control system.

Conventional aircraft environmental control systems (ECS) incorporate an air cycle machine (ACM), also referred to as an air cycle cooling machine, for cooling and dehumidifying air supplied to an aircraft cabin. ACMs commonly include at least one turbine and a compressor spaced axially at intervals on a common shaft. The turbine(s) and compressor are supported for rotation about the axis of the shaft by one or more bearing assemblies.

On aircraft powered by turbine engines, the air to be conditioned in the ACM is typically compressed air bled from one or more compressor stages of a turbine engine. In conventional systems, this bleed air is passed through the ACM compressor, where it is further compressed, then passed through a condensing heat exchanger to cool the compressed air. The heat exchanger sufficiently condenses moisture thereby dehumidifying the air. The dehumidified compressed air is then expanded in one of the turbines to extract energy from the compressed air so as to drive the shaft and also to cool the expanded turbine exhaust air as it is supplied to the cabin as conditioned cooling air.

ACMs often have a three-wheel or four-wheel configuration. In a three-wheel ACM, a turbine drives both a compressor and a fan which rotate on a common shaft. In a four-wheel ACM, two turbine sections drive a compressor and a fan on a common shaft.

Airflow must be directed into the fan section to the compressor section, away from the compressor section towards the heat exchanger, from the heat exchanger to the turbine or turbines, and from the final turbine stage out of the ACM. In at least some of these transfers, it is desirable to direct air radially with respect to the central axis of the ACM. To accomplish this, nozzles may be used to generate radial in-flow and/or out-flow.

To contain and route airflow through the ACM, components of the ACM must be designed to balance operational efficiency, internal cooling, and reliability. Reduced airflow and internal leakage can increase loads on certain ACM components, while increased internal leakage can lower operational efficiency and increase fuel consumption.

BRIEF DESCRIPTION OF THE INVENTION

According to one embodiment of the invention, a thrust plate assembly for an air cycle machine includes an annular body defined by an outer rim and a main bore. The annular body includes a nozzle side and a thrust bearing side. The nozzle side includes a nozzle region proximate the outer rim and a turbine rotor region proximate the main bore, where the outer rim has an outer diameter. The thrust plate assembly also includes a main bore seal installed in the main bore. The main bore seal has an inner diameter, where a ratio of the outer diameter of the outer rim to the inner diameter of the main bore seal is between 3.94 and 3.96.

According to another embodiment, a method of installing a thrust plate assembly in an air cycle machine includes positioning a main bore seal in a main bore of the thrust plate assembly proximate a thrust shaft of the air cycle machine to establish a labyrinth seal. An outer rim of an annular body of the thrust plate assembly is positioned proximate a turbine housing of the air cycle machine. The annular body includes a nozzle side and a thrust bearing side. The nozzle side includes a nozzle region proximate the outer rim and a turbine rotor region proximate the main bore. The outer rim has an outer diameter, and the main bore seal has an inner diameter, where a ratio of the outer diameter of the outer rim to the inner diameter of the main bore seal is between 3.94 and 3.96. The thrust plate assembly is coupled to the turbine housing.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
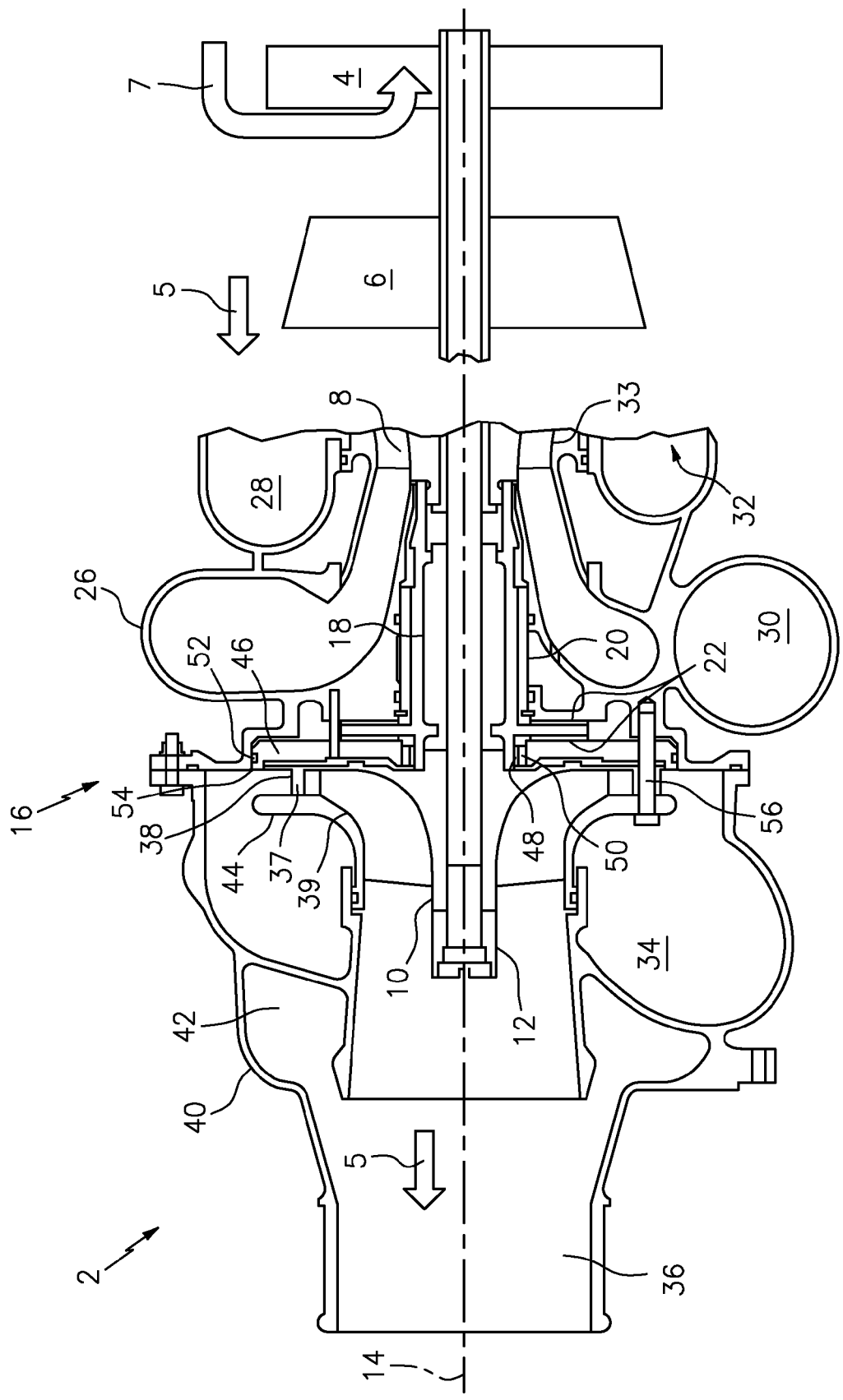
FIG. 1 is a cross-sectional view of an air cycle machine (ACM) according to an embodiment.

FIG. 1 is a partial cross-sectional view of an air cycle machine (ACM) 2 according to an embodiment. The ACM 2 is a four-wheel ACM, including a fan section 4, a compressor section 6, a first turbine section 8, and a second turbine section 10, which are all connected to a shaft 12. In operation, the shaft 12 rotates about a central axis 14. In the example of FIG. 1, the first turbine section 8 and the second turbine section 10 are depicted in greater detail as turbine assembly 16, while the fan section 4 and compressor section 6 are depicted schematically.

When a first working fluid 5 passes through the ACM 2, it is compressed in compressor section 6, and then expanded in the first turbine section 8 and the second turbine section 10. The first working fluid 5 may be heated or cooled in a heat exchanger (not depicted) through which the first working fluid 5 can be routed as it passes between the compressor section 6 and the first turbine section 8. The first turbine section 8 and the second turbine section 10 extract energy from the first working fluid 5, turning the shaft 12 about the central axis 14. A second working fluid 7 can be routed through the same heat exchanger by the fan section 4. As one example, the first working fluid 5 may be routed from a bleed valve of a gas turbine engine through the compressor section 6, to a heat exchanger, to the first turbine section 8, then to the second turbine section 10, and then to an environmental control system of an aircraft. The second working fluid 7 may be ram air that is pulled by the fan section 4 through the same heat exchanger to cool the first working fluid 5 to a desired temperature before routing of the first working fluid 5 to the first and second turbine sections 8 and 10. By compressing, heating, and expanding the first working fluid 5, output provided at the second turbine 10 may be adjusted to a desired temperature, pressure, and/or relative humidity.

The first turbine section 8 includes a first stage turbine housing 26, a first stage turbine inlet 28, a first stage turbine outlet 30, a first stage turbine nozzle section 32, and first stage turbine blades 33. The first stage turbine inlet 28 is a duct defining an aperture through which the first working fluid 5 passes prior to expansion in the first turbine section 8. The first stage turbine outlet 30 is a duct defining an aperture through which the first working fluid 5 (which has expanded) departs the first turbine section 8. The first stage turbine nozzle section 32 cooperates with the first stage turbine blades 33 to extract energy from the first working fluid 5 passing therethrough, driving the rotation of the first turbine section 8 and attached components, including the shaft 12, the fan section 4, and the compressor section 6. The first stage turbine nozzle section 32 may be configured as a radial in-flow rotor.

The second turbine section 10 includes a second stage turbine inlet 34, a second stage turbine outlet 36, a second stage turbine nozzle 38, second stage turbine blades 39, a second stage turbine housing 40, and a second stage turbine bypass 42. The second stage turbine inlet 34 is a duct defining an aperture through which the first working fluid 5 passes prior to expansion in the second turbine section 10. The second stage turbine outlet 36 is a duct defining an aperture through which the first working fluid 5 (which has expanded) departs the second turbine section 10. The second stage turbine nozzle 38 cooperates with the second stage turbine blades 39 to extract energy from the first working fluid 5 passing therethrough, driving the rotation of the second turbine section 10 and attached components, including the shaft 12, the fan section 4, and the compressor section 6. The second stage turbine nozzle 38 includes a plurality of nozzle vanes 37 configured as a radial out-flow rotor. The first working fluid 5 passes from the second stage turbine inlet 34, where it is incident upon the second stage turbine nozzle 38. The first working fluid 5 then passes between the nozzle vanes 37. The nozzle vanes 37 may pivot to guide entry of the first working fluid 5 into the second stage turbine blades 39. The nozzle vanes 37 are positioned between a second stage turbine shroud 44 and a thrust plate assembly 46.

The shaft 12 may include a number of components, such as a thrust shaft 18 that is supported by a journal bearing 20 and a thrust bearing 22. A cooling flow may be routed radially proximate the thrust plate assembly 46 and around the thrust bearing 22 to provide flow for the journal bearing 20 and within the thrust shaft 18. A labyrinth seal 48 is formed between the thrust shaft 18 and a main bore seal 50 of the thrust plate assembly 46. A housing seal 52 may also be installed between an outer rim 54 of the thrust plate assembly 46 and the first stage turbine housing 26. A plurality of fasteners 56, such as bolts, may be used to couple the second stage turbine shroud 44, the second stage turbine nozzle 38, the thrust plate assembly 46, and the first stage turbine housing 26 together.

Figure 2:
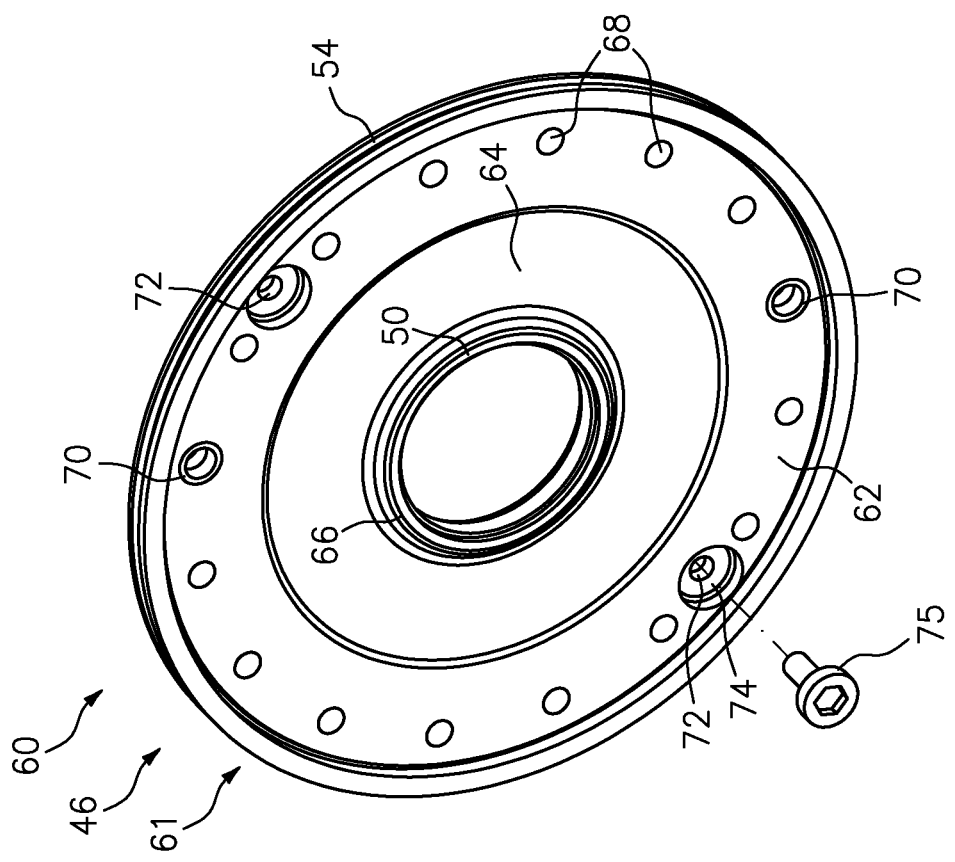
FIG. 2 is a perspective view of a nozzle side of a thrust plate assembly of the ACM of FIG. 1 according to an embodiment.

FIG. 2 is a perspective view of a nozzle side 60 of the thrust plate assembly 46 of the ACM 2 of FIG. 1 according to an embodiment. The thrust plate assembly 46 includes an annular body 61 defined by the outer rim 54 and a main bore 66. The nozzle side 60 of the annular body 61 includes a nozzle region 62 proximate the outer rim 54 and a turbine rotor region 64 proximate the main bore 66 of the thrust plate assembly 46. The main bore seal 50 is installed in the main bore 66. The second stage turbine blades 39 of FIG. 1 are installed on a turbine rotor of the second turbine section 10 of FIG. 1 proximate the turbine rotor region 64 in the ACM 2 of FIG. 1.

In an embodiment, the nozzle region 62 includes a plurality of apertures 68 to position a plurality of the nozzle vanes 37 (FIG. 1) of the second stage turbine nozzle 38 (FIG. 1) in the ACM 2 of FIG. 1. One or more of the apertures 68 may include threaded inserts 70 to support installation of the fasteners 56 of FIG. 1. The nozzle region 62 may also include at least one assembly aperture 72 with a counterbore 74 to support installation of a fastener 75 entirely below a surface of the nozzle region 62 during assembly of the ACM 2 of FIG. 1. For instance, once the thrust plate assembly 46 is positioned relative to the thrust bearing 22, installation of one or more fasteners 75 enables the ACM 2 of FIG. 1 to change in orientation as assembly continues. The counterbore 74 prevents installed fasteners 75 from interfering with the nozzle vanes 37 of FIG. 1.

Figure 3:
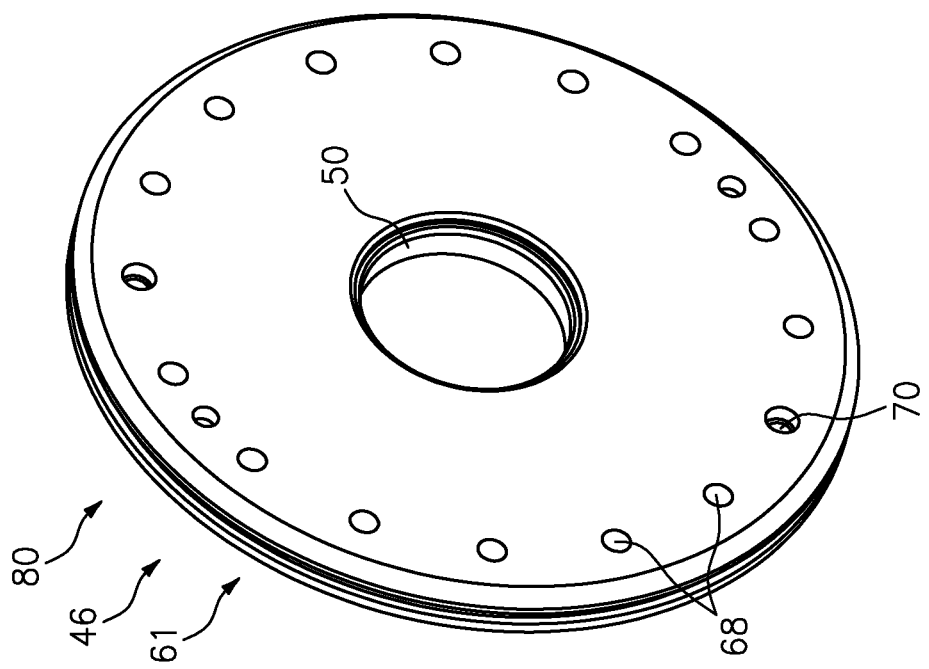
FIG. 3 is a perspective view of a thrust bearing side of the thrust plate assembly of the ACM of FIG. 1 according to an embodiment.

FIG. 3 is a perspective view of a thrust bearing side 80 of the thrust plate assembly 46 of the ACM 2 of FIG. 1 according to an embodiment. In an embodiment, the thrust bearing side 80 is opposite the nozzle side 60 of the annular body 61. The thrust bearing side 80 is substantially flat and configured to act as a cooling flow barrier relative to the thrust bearing 22 of FIG. 1.

Figure 4:
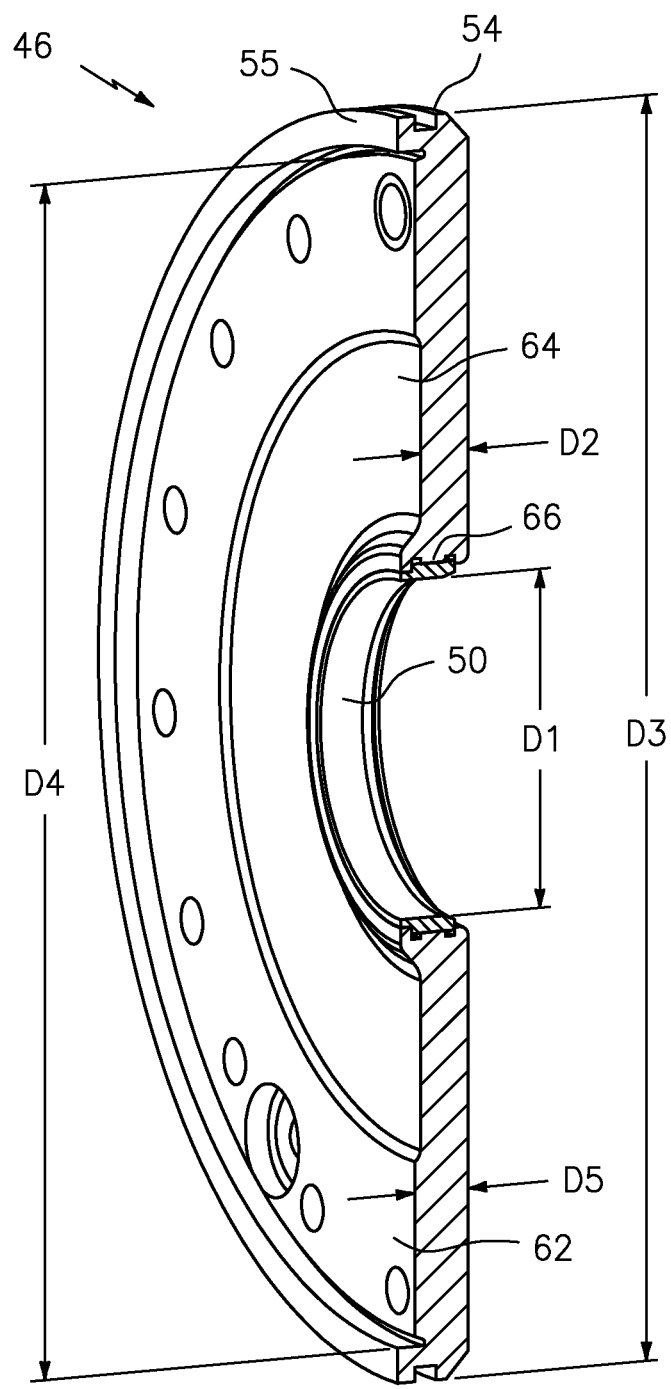
FIG. 4 is a cross-section of the thrust plate assembly of the ACM of FIG. 1 according to an embodiment.

FIG. 4 is a cross-section of the thrust plate assembly 46 of the ACM 2 of FIG. 1 according to an embodiment. In the example of FIG. 4, it can be seen that the main bore seal 50 has an inner diameter D1, and the outer rim 54 has an outer diameter D3. It can also be seen that the turbine rotor region 64 has an axial thickness D2, and the nozzle region 62 has an axial thickness D5. In an embodiment, the outer rim 54 includes a lip 55 that defines a transition between the outer rim 54 and the nozzle region 62, where the lip 55 has an inner lip diameter D4. The lip 55 may act as a pilot for locating the second stage turbine nozzle 38 (FIG. 1) during assembly of the ACM 2 of FIG. 1.

In an embodiment, the inner diameter D1 of the main bore seal 50 is about 1.635 inches (4.153 cm). The axial thickness D2 of the turbine rotor region 64 is about 0.285 inches (0.724 cm). The outer diameter D3 of the outer rim 54 is about 6.454 inches (16.393 cm). The inner lip diameter D4 is about 6.108 inches (15.514 cm). The axial thickness D5 of the nozzle region 62 is greater than the axial thickness D2 of the turbine rotor region 64. A ratio of the outer diameter D3 of the outer rim 54 to the inner diameter D1 of the main bore seal 50 is between 3.94 and 3.96. A ratio of the inner diameter D1 of the main bore seal 50 to the axial thickness D2 of the turbine rotor region 64 is between 5.63 and 5.85. A ratio of the outer diameter D3 of the outer rim 54 to the axial thickness D2 of the turbine rotor region 64 is between 22.24 and 23.06. A ratio of the inner lip diameter D4 to the inner diameter D1 of the main bore seal 50 is between 3.73 and 3.74. A ratio of the outer diameter D3 of the outer rim 54 to the inner lip diameter D4 is between 1.05 and 1.06. A ratio of the inner lip diameter D4 to an axial thickness D2 of the turbine rotor region 64 is between 21.05 and 21.82.

A process for installing the thrust plate assembly 46 in the ACM 2 of FIG. 1 is described in reference to FIGS. 1-4. The sequence of assembly during installation of the thrust plate assembly 46 in the ACM 2 can vary in embodiments. The process includes positioning the main bore seal 50 in the main bore 66 of the thrust plate assembly 46 proximate the thrust shaft 18 of the ACM 2 to establish the labyrinth seal 48. The outer rim 54 of the annular body 61 of the thrust plate assembly 46 is positioned proximate the first stage turbine housing 26 of the ACM 2. As previously described, the annular body 61 includes a nozzle side 60 and a thrust bearing side 80. The nozzle side 60 includes a nozzle region 62 proximate the outer rim 54 and a turbine rotor region 64 proximate the main bore 66. The outer rim 54 has an outer diameter D3, and the main bore seal 50 has an inner diameter D1, where a ratio of the outer diameter D3 of the outer rim 54 to the inner diameter D1 of the main bore seal 50 is between 3.94 and 3.96. The thrust plate assembly 46 is coupled to the first stage turbine housing 26. Coupling can include installing at least one fastener 75 in at least one assembly aperture 72 entirely below a surface of the nozzle region 62 during assembly of the ACM 2 (e.g., within counterbore 74). Coupling can also include installing fasteners 56 through the second stage turbine shroud 44, the second stage turbine nozzle 38, the thrust plate assembly 46, and the first stage turbine housing 26, for instance, including use of the threaded inserts 70.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A thrust plate assembly for an air cycle machine, comprising:
an annular body defined by an outer rim and a main bore, the annular body comprising a nozzle side and a thrust bearing side, the nozzle side comprising a nozzle region proximate the outer rim and a turbine rotor region proximate the main bore, the outer rim having an outer diameter, wherein the nozzle region comprises a plurality of apertures to position a plurality of nozzle vanes in the air cycle machine and at least one assembly aperture comprising a counterbore to support installation of a fastener entirely below a surface of the nozzle region during assembly of the air cycle machine; and
a main bore seal installed in the main bore, the main bore seal having an inner diameter, wherein a ratio of the outer diameter of the outer rim to the inner diameter of the main bore seal is between 3.94 and 3.96.

2. The thrust plate assembly of claim 1, wherein an axial thickness of the nozzle region is greater than an axial thickness of the turbine rotor region.

3. The thrust plate assembly of claim 2, wherein a ratio of the inner diameter of the main bore seal to the axial thickness of the turbine rotor region is between 5.63 and 5.85.

4. The thrust plate assembly of claim 2, wherein a ratio of the outer diameter of the outer rim to the axial thickness of the turbine rotor region is between 22.24 and 23.06.

5. The thrust plate assembly of claim 1, wherein the outer rim comprises a lip defining a transition between the outer rim and the nozzle region, the lip having an inner lip diameter, and a ratio of the inner lip diameter to the inner diameter of the main bore seal is between 3.73 and 3.74.

6. The thrust plate assembly of claim 5, wherein a ratio of the outer diameter of the outer rim to the inner lip diameter is between 1.05 and 1.06.

7. The thrust plate assembly of claim 5, wherein a ratio of the inner lip diameter to an axial thickness of the turbine rotor region is between 21.05 and 21.82.

8. A method of installing a thrust plate assembly in an air cycle machine, the method comprising:
positioning a main bore seal in a main bore of the thrust plate assembly proximate a thrust shaft of the air cycle machine to establish a labyrinth seal;
positioning an outer rim of an annular body of the thrust plate assembly proximate a turbine housing of the air cycle machine, the annular body comprising a nozzle side and a thrust bearing side, the nozzle side comprising a nozzle region proximate the outer rim and a turbine rotor region proximate the main bore, the outer rim having an outer diameter and the main bore seal having an inner diameter, wherein a ratio of the outer diameter of the outer rim to the inner diameter of the main bore seal is between 3.94 and 3.96; and
coupling the thrust plate assembly to the turbine housing.

9. The method of claim 8, wherein an axial thickness of the nozzle region is greater than an axial thickness of the turbine rotor region and a ratio of the inner diameter of the main bore seal to the axial thickness of the turbine rotor region is between 5.63 and 5.85.

10. The method of claim 8, wherein a ratio of the outer diameter of the outer rim to an axial thickness of the turbine rotor region is between 22.24 and 23.06.

11. The method of claim 8, wherein the nozzle region comprises a plurality of apertures to position a plurality of nozzle vanes in the air cycle machine and at least one assembly aperture comprising a counterbore, the method further comprising:
installing a fastener in the at least one assembly aperture entirely below a surface of the nozzle region during assembly of the air cycle machine.

12. The method of claim 8, wherein the outer rim comprises a lip defining a transition between the outer rim and the nozzle region, the lip having an inner lip diameter, and a ratio of the inner lip diameter to the inner diameter of the main bore seal is between 3.73 and 3.74.

13. The method of claim 12, wherein a ratio of the outer diameter of the outer rim to the inner lip diameter is between 1.05 and 1.06.

14. The method of claim 12, wherein a ratio of the inner lip diameter to an axial thickness of the turbine rotor region is between 21.05 and 21.82.

* * * * *